Jan. 22, 1946.   W. LEATHERS ET AL   2,393,386
ACCOUNTING MACHINE
Filed April 21, 1943   2 Sheets-Sheet 1
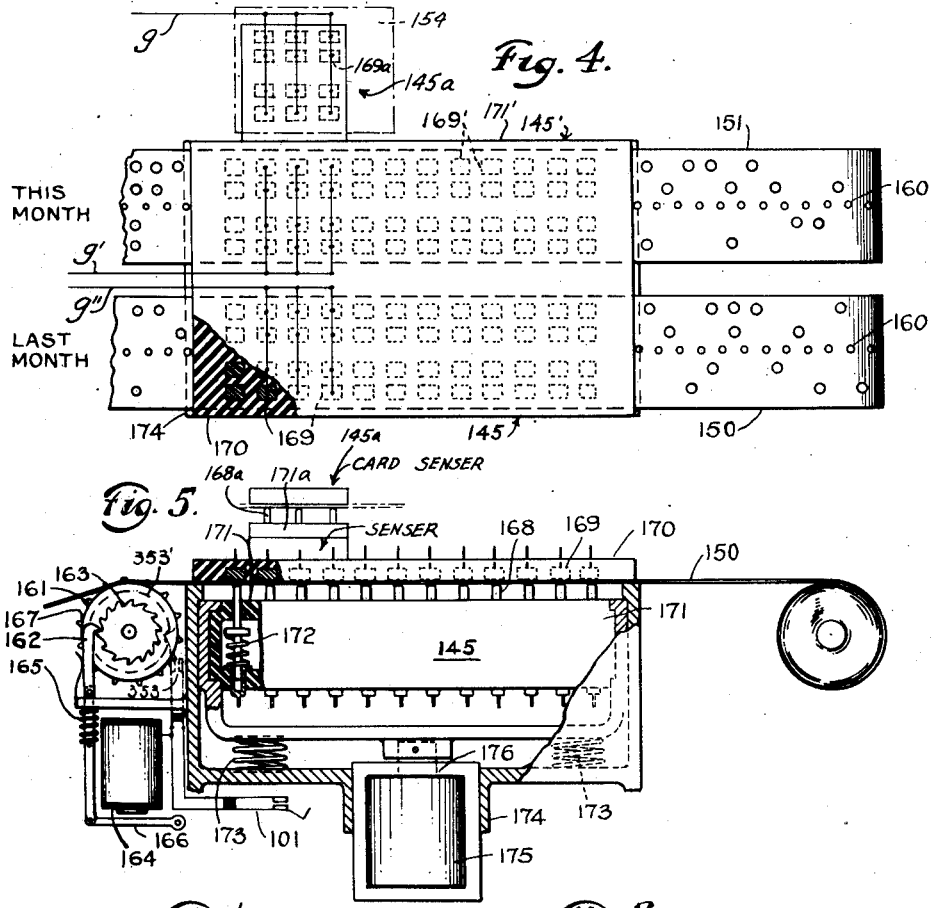
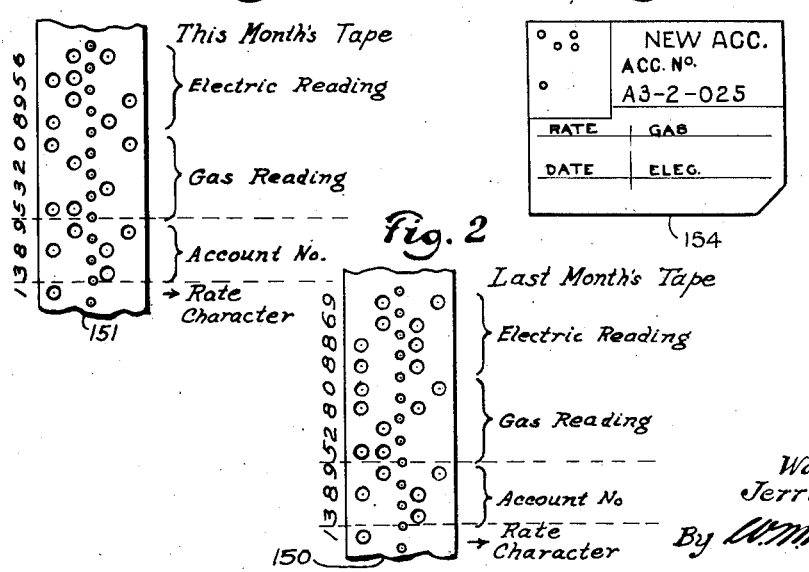
INVENTORS.
Ward Leathers,
Jerrier Haddad

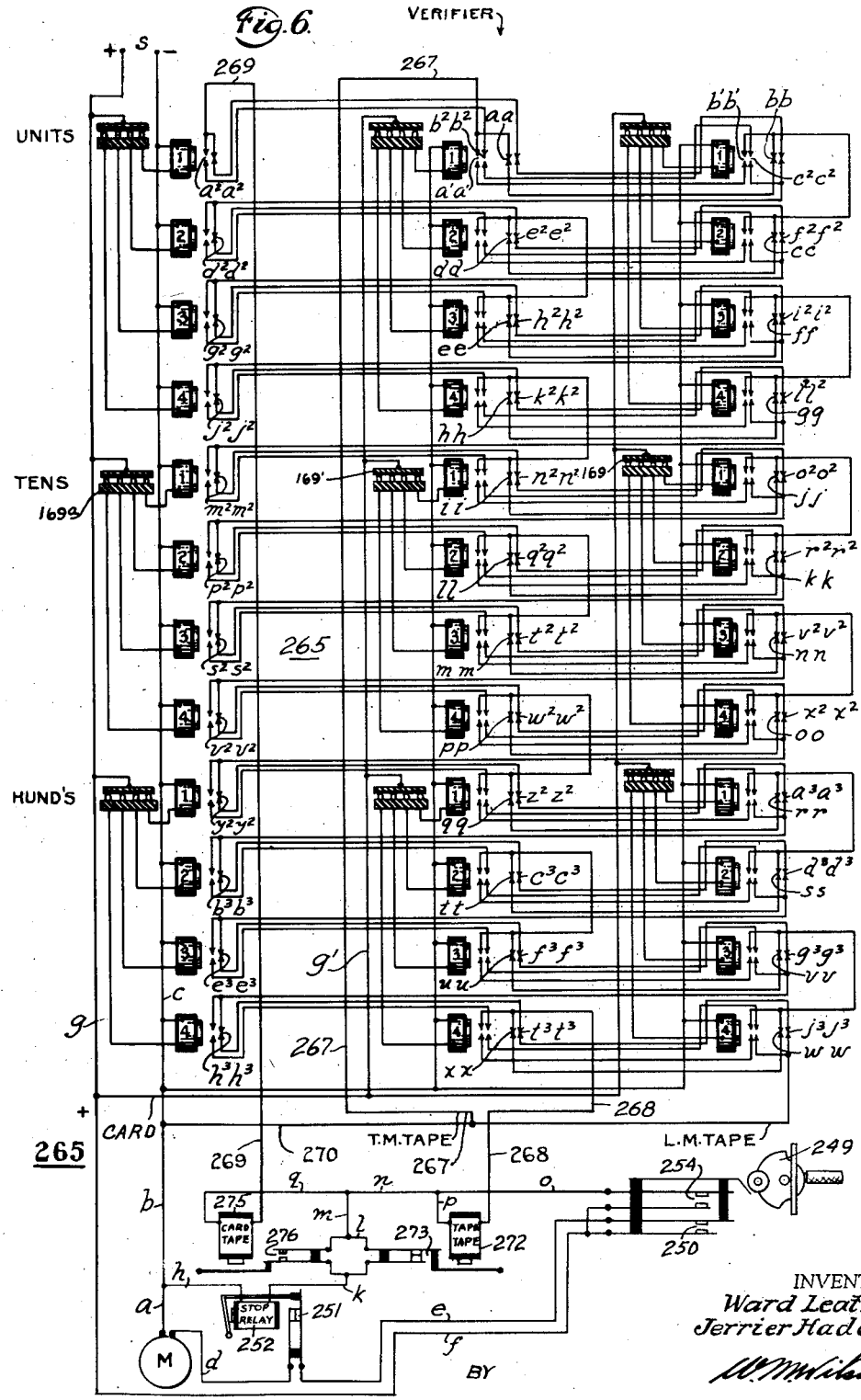

Patented Jan. 22, 1946

2,393,386

UNITED STATES PATENT OFFICE 2,393,386

ACCOUNTING MACHINE

Ward Leathers and Jerrier Haddad, Brooklyn, N. Y., assignors to International Business Machines Corporation, New York, N. Y., a corporation of New York Application April 21, 1943, Serial No. 483,880

2 Claims. (Cl. 235—61.7)

The improved verification apparatus comprising the present invention is primarily adapted for use in connection with the verification of perforated record media, as for example, tape which has been perforated according to a four-line or other code to represent the consumption of metered commodities, such as gas, electricity, water and the like. The principal object of the present invention is to provide a verification apparatus which will compare the material recorded on one record media with the material recorded on another record media and to perform certain functions when the material recorded on the two record media is not identical.

According to the present invention, where a public utility commodity, such as gas or electricity, is billed to a consumer, or where two or more such commodities are jointly billed to a single consumer, the primary or initial data will be carried on two separate rolls of tape, one representing last month's account and the other representing this month's account. This initial data will include, among other things, an account number for each individual consumer. Other data carried by the initial data tape, but with which the present invention is not particularly concerned, may include a rate character and previous and present meter readings either for gas or electricity, or for both, all of this data being recorded on the telemetric type tapes according to a selected code. This material on the two tapes forms the basis for computation of the billing data which is perforated on a roll of billing tape automatically as the two primary tapes are processed in an accounting machine. The primary or initial data may be obtained by telemetric methods, such as are shown and described in U. S. patents to Ward Leathers, Nos. 2,283,070; 2,283,071; 2,285,819; 2,304,698 and 2,314,719, all of which relate to meter reading apparatus, or it may be compounded each month from hand written data in a meter reader's account book.

The present verification apparatus is designed for use in connection with accounting machines of the type which are utilized in the processing of two primary tapes, one representing various last month's accounts and the other representing corresponding this month's accounts. Such accounting machines are adapted to process the two primary tapes by producing on a third roll of tape billing data which is derived from the two primary tapes. The billing data for electricity, for example, may consist of the account number, a rate character, the present and previous month's meter readings, the consumption during the billing period, i. e. the difference between the two readings, the fuel adjustment which may be added to or subtracted from the charge, the tax which is derived from the sum of the charge and the fuel adjustment, and a total figure representing the total money sum to be paid for electricity. The billing data for gas may similarly be set forth. The present invention is concerned only with the two account numbers appearing on the respective primary tapes for it is necessary to the proper processing of a single individual account that the account numbers appearing on these two tapes agree with one another so as to avoid a condition wherein one customer's account for a previous month is balanced against a different customer's account for the next succeeding month. In other words, the present invention is concerned primarily with the verification of the account numbers appearing in code on the two primary tapes to insure the fact that the other data appearing thereon is related to only one account. According to the present invention, if the two tapes do not verify, a certain function is accomplished, such as the opening of a suitable work circuit by means of which the motor which operates the accounting or processing machine may be caused to automatically stop. If the two tapes do verify with each other, the work circuit is allowed to remain closed in order that the motor may run continuously during the processing of the successive accounts.

An important feature of the invention resides in the accommodation of special circumstances frequently encountered in public utility accounting, as for example, where a consumer discontinues an account or where a consumer opens a new account in the middle of a billing period. In such an instance, a reading for that particular account will be entered on one of the primary tapes but not upon the other. In order to keep the sequence of the account readings on the two tapes correct, a special notation must be made beforehand to inform the operator of the machine that the omission of a reading on one tape is proper and that it is not a mistake caused by negligence or otherwise.

To accommodate special conditions such as those just described, the present verification apparatus is so designed that if the account numbers appearing on the two primary tapes verify with each other, and also verify with the account number appearing on a specially prepared perforated card which is held in readiness by the operator and injected into the apparatus at the proper time to signify a new account, a closed account or the like, the work circuit will automatically be closed in spite of the first verification to perform a desired function, such as the stopping of the accounting machine.

In carrying out the above mentioned objects, the invention briefly contemplates the provision of an electrical sensing apparatus for one of the primary tapes and a similar sensing apparatus for the other primary tape, the two sensing devices being designed for operation in unison to advance the two tapes synchronously. A third sensing apparatus normally remains inoperative but, during such contingencies as the opening of an account or the closing thereof as above referred to, is adapted to receive therein the specially prepared cards having perforations therein corresponding to the perforations representing the account numbers on the two primary tapes. When such a card is inserted in the machine and the account number appearing on the latter agrees with the two account numbers appearing on the primary tapes, provision is made for closing an otherwise open work circuit by means of which opening the accounting machine controlled by the verification apparatus is caused to cease its operation.

The provision of an apparatus of the character set forth above being the principal object of the invention, other objects and advantages thereof not at this time enumerated will become more readily apparent as the following description ensues.

In the accompanying two sheets of drawings forming a part of this specification, one embodiment of the invention is shown. In these drawings:

Fig. 1 is a fragmentary, plan view of a typical strip of billing data tape perforated according to a selected code and representing a particular consumer's account for gas and electricity for the present month.

Fig. 2 is a fragmentary view, similar to Fig. 1, representing the same consumer's account for the previous month.

Fig. 3 is a plan view of a perforated record card for the same consumer and representing the opening of a new account.

Fig. 4 is a plan view, partly in section, of a sensing device forming a part of the verification apparatus which comprises the present invention.

Fig. 5 is a side elevational view, partly in section, of the sensing device shown in Fig. 4.

Fig. 6 is a diagrammatic view of the verifier comprising the present invention.

In all of the above described views like characters of reference are employed to designate like parts throughout.

The primary information for calculating the billing data for both gas and electricity appears in the form of perforations on two strips of tape 150 and 151, shown in Figs. 1 and 2 respectively, and hereinafter referred to as the primary data tapes, or simply as the primary tapes. The data appearing on the tapes 150 and 151 may be obtained by a telemetric system of meter reading or it may be obtained by actual inspection of the meters in the usual manner of public utility accounting. Irrespective, however, of the manner in which the meter reading data is obtained, the essential features of the invention are at all times preserved. The data appearing on the two primary tapes 150 and 151 may be processed in any suitable manner and a third tape known as the billing data tape perforated in accordance with the information appearing on the tapes 150 and 151. The information appearing on the primary data tapes 150 and 151 is in the form of a selected telegraphic code, such as is shown in Figs. 1 and 2.

On each of the primary data tapes 150 and 151 a single account is represented for illustrative purposes by four fields involving twelve index point positions. The first character recorded is a complete field in itself and may represent the rate at which the bill for that account should be computed. The next three characters constituting the second field may represent the account number of an individual consumer. In the present instance, only three digits are employed to identify a single account.

The next four characters are employed to represent the gas meter reading. This reading is cumulative and a previous recording of a reading must be subtracted from it to get the proper consumption figure for a billing period on the billing tape. The last four characters are employed to represent the electric meter reading. This reading is likewise cumulative and a previous reading must be subtracted from it to get the proper consumption figure on the billing tape. As previously stated, the data which appears on the two primary tapes 150 and 151 is processed by a suitable accounting apparatus and a billing data tape is perforated in accordance therewith.

Briefly, the present invention contemplates the provision of a sensing mechanism for the tapes 150 and 151, this mechanism being designated in its entirety at 145, 145'. The tapes 150 and 151 are adapted to be advanced through the sensing mechanism simultaneously. If for any reason these two tapes fail to advance in unison and the relative position of the tapes become misaligned, or if for any reason an account is dropped from or added to one of the tapes and not to the other so that the tapes are not at all times offering information for the same account, certain circuits that will be described presently will automatically become closed or opened to perform a desired function which in the present instance consists in the operation of a relay by means of which the motor, which drives the entire accounting apparatus, is automatically stopped to prevent perforation of the final billing data tape. According to the present invention, it is also desirable that these circuits be caused to stop the machine if two account numbers on the tapes 150 and 151 verify with each other and also verify with a number appearing on a special card, such as is shown at 154 in Fig. 3, representing the opening of a new account and which is adapted to be injected into the machine at the proper time for verification purposes. Thus, the machine will proceed to perforate the billing tape when, and only when, the account numbers appearing in the second field of the tapes 150 and 151 agree with each other but do not agree with the account number appearing on the special card 154.

The operator of the machine must be informed of all special conditions associated with the primary data tapes. These conditions may be caused by a consumer opening an account or closing an account at which time a card, such as the card 154, is prepared for use. Special bills must be made out in such cases for the services of the utility during the particular fractions of the billing periods. Such bills are not cared for by the accounting apparatus. These bills will be calculated and prepared manually by the bookkeeping department of the utility company. In such event, the information on the primary data tapes relating to the special bills must be removed by the operator and forwarded to the bookkeeping department. The operator must also reestablish the positions of the primary data tapes in the machine so that they offer the very next account for processing. To do this, the operator may either copy down the necessary data appearing on the tapes for forwarding and thereafter advance the tapes to the beginning of the next account, or he may sever fragments of the tapes and remove the same from the machine for forwarding, thereafter resorting to a splicing operation to restore the tapes to their proper relative positions.

When an account is opened during a billing period, there will be no reading on last month's primary data tape to verify with the new reading. The machine will automatically stop, and the operator will check the account number on this month's tape with a new account card, similar to the card 154; take all information needed pertaining to that account from the tape and record it on the card; advance this month's tape until the following account is in position for processing; replace the new account card just used with the one that will next be used, and start the machine running automatically again. If an account is closed a similar procedure is followed.

After the verification processes have been concluded, the account number, consisting of three digits, is automatically perforated on the billing data tape by the accounting apparatus.

The two primary tapes 150 and 151 are each provided with a series of longitudinally extending, centrally arranged drive hole perforations 160, by means of which they are advanced through their respective sensing mechanisms 145 and 145' in side-by-side relationship. The sensing instrumentalities for each of the tapes 150 and 151 are substantially identical in construction and it is thought that a description of one of these sets of instrumentalities will suffice for the other. Accordingly, similar characters of reference have been employed to designate the corresponding parts of the two sets of instrumentalities.

The sensing mechanism includes a stationary framework 174 in which the two sets of sensing instrumentalities are commonly housed. The sensing instrumentalities for the tape 150 include a rotatably mounted drive wheel 161, having drive pins 167 arranged in spaced relationship about the periphery thereof for registry with the perforations 160 in advancing the tape through the sensing mechanism. The drive wheel 161 is adapted to be periodically indexed by means of a pawl and ratchet mechanism 162, 163, the operation of which is controlled by means of an electromagnet 164. It will be seen that upon energization of the magnet 164, the pawl 162 associated therewith will be retracted and upon deenergization of the magnet the pawl will perform its operative stroke under the influence of a spring 165, thus advancing the drive wheel 161 and causing the tape to be pulled through the sensing device.

A plurality of metallic sensing pins 168 are located directly beneath each index point position of the tape 150, while a cooperating metallic bar 169 is located directly above each index point position in cooperating registry with one of the sensing pins 168. The bars 169 are set into an insulating block 170 rigidly supported in the framework 174 of the apparatus. Each individual sensing pin 168 is supported in an insulating block 171 in the form of a floating cradle which is normally urged upwardly by means of a pair of springs 173. Each sensing pin 168 is normally urged upwardly into engagement with its respective bar 169 by means of a spring 172. An electromagnet 175, suitably supported on the framework 174, is provided with a plunger 176 pivotally secured to the cradle or block 171, and upon energization of the magnet 175 the entire cradle is lowered in the framework 174 in order that the various pins 168 may clear the tape and permit the latter to be advanced through the senser. The means for energizing the electromagnets 175 and 164 form no part of the present invention. It is to be noted that the sensing apparatus herein shown and described makes provision for mechanically sensing twelve index positions on the tapes 150 and 151 simultaneously. The first index point position beginning at the left side of Fig. 4 is adapted to accommodate the rate character and the fifth to twelfth index positions are adapted to accommodate the consumption figures for gas and electricity, as shown in Figs. 1 and 2, and consequently the present invention is not concerned with those portions of the sensing mechanism which operate upon these index point positions. The present invention is concerned only with the sensing and verification of the second, third and fourth index positions of the tape in the senser which represent the account numbers of an individual consumer.

The card sensing mechanism is designated in its entirety at 145a in Fig. 4. The card sensing mechanism 145a is adapted to receive and sense the various special account cards, such as the card 154, representing a new account. The sensing mechanism 145a is somewhat similar in its design and operation to the sensing units which cooperate to make up the sensing mechanism 145, 145', for sensing the primary tapes. Accordingly, similar reference characters are applied thereto. The mechanism is shown more or less diagrammatically in Fig. 4 and includes a plurality of upper sensing bars 169a and lower cooperating sensing pins 168a, the latter being carried in an insulating block 171a. The sensing pins 168a are normally urged upwardly into engagement with the sensing bars 169a by means of coil springs (not shown) similar in function to the spring 172. The special account cards are formed of relatively thick cardboard and these cards are adapted to be manually inserted in position in the sensing device 145a. As a consequence, no advancing mechanism is required, nor is there any necessity for lowering the block 171a to cause the pins to clear the card when the card is inserted into or removed from the apparatus. If desired, the upper ends of the sensing pins may be rounded to provide a camming action when the card is inserted into the apparatus.

In the verification of data appearing on the two tapes 150 and 151 and upon any special cards, such as the card 154, the account numbers appearing in the second fields of the primary tapes and the account number appearing on the card are the only numbers which are verified by the present apparatus. It will also be remembered that not only must the two account numbers appearing on the tapes be verified with each other but they must fail to verify with the account number appearing on the special card when such card is inserted in the machine.

The verification apparatus comprising the present invention is diagrammatically illustrated in Fig. 6 and is designated in its entirety at 265. This apparatus is in the form of a more or less elaborate circuit maker and breaker, whose ultimate function is to selectively energize or deenergize one or another of a pair of output circuits represented by the lines 269, 270 and 267, 268 respectively to perform a desired function. Since the present verification apparatus is associated with and forms a part of an accounting machine, for illustrative purposes energization or deenergization of one or the other of the output circuits 269, 270 or 267, 268, as the case may be, serves to render the accounting machine inoperative when desired verification of the record media fails to take place or when undesired verification of the record media takes place. The manner in which the accounting machine is thus brought to a stop will be set forth presently.

Closing of the output circuit 269, 270 or of the output circuit 267, 268, may be utilized to perform any desired function, but in the present instance, for illustrative purposes, energization of one or deenergization of the other of these circuits operates through relay control means to open a work circuit and disconnect an electric motor M from its source of energizing current to stop the motor and prevent operation of the accounting machine with which it is associated. Accordingly, the motor M is connected by means of lines *a*, *b* and *c* to the negative side of a source of energizing current S. The motor is also connected by means of line *d*, a pair of normally closed contacts 251, line *e*, normally open contacts 250, and lines *f* and *g* to the positive side of the source of energizing current. The pair of normally open contacts 250 are associated with a manually operable toggle switch 249 and are adapted when closed to immediately supply current for the motor M providing the pair of contacts 251 previously mentioned are in their normally closed position. The motor circuit just described is adapted to remain complete as long as the contacts 251 and 250 remain closed, opening of either of these pairs of contacts serving, of course, to stop the motor. The pair of contacts 251 operate under the control of a stop relay 252 which is suitably legended on the drawings. The stop relay 252 remains normally deenergized so as to maintain the contacts 251 closed but upon energization of the relay the contacts 251 are adapted to become open to stop the motor.

The electrical circuit for the stop relay leads from the negative side of the source S through lines *c*, *b*, *h*, the relay 252 itself, line *k*, a pair of normally closed contacts 273, lines *l*, *m*, *n*, *o*, a pair of normally open contacts 254 adapted to be closed by the toggle switch 249 and lines *f* and *g* to the positive side of the source S. The stop relay is also adapted to be energized by an alternative circuit extending from the negative side of the source S through lines *c*, *b*, *h*, the relay 252 itself, line *k*, a pair of normally open contacts 276 (when closed), lines *m*, *n* and *o*, contacts 254 and lines *f* and *g* to the positive side of the source.

The normally closed contacts 273 are adapted to become open upon energization of a relay magnet 272, labeled "Tape-Tape" and meaning tape-to-tape verification. Similarly, the pair of normally open contacts 276 are adapted to become closed upon energization of a relay magnet 275 labeled "Card-Tape" and meaning card-to-tape verification. Both of the relay magnets 272 and 275 are connected to the positive side of the source S, this connection in the case of the magnet 272 existing through lines *p*, *o*, contacts 254 and lines *f* and *g*. In the case of the magnet 275, the connection to the positive side of the source exists through lines *q*, *n*, *o*, contacts 254, lines *f* and *g*. Connection of the magnets 272 and 275 to the negative side of the source S is adapted to be established through one or more of a plurality of circuitous or labyrinth routes passing through the verifier proper, the existence or non-existence of such routes being predicated upon verification or non-verification existing between the two primary tapes or between these tapes and a card as previously explained.

Toward these ends, the verifier includes an electromagnetically controlled relay for each index point position of the account number on each tape and on the card. These relays are arranged in three banks and each bank is divided into three groups, each group corresponding to a respective sensing device. Each magnet is arranged in a circuit with a respective pin in the sensing device to which its respective group corresponds. Whenever the sensing devices sense a perforation in a tape or a card, a corresponding electromagnetic relay will become energized. For convenience, the relays of the verifier 265 have been labeled in groups of four and each group of relays is controlled by the index point positions in a tape or card representing a single digit of the account number. For purposes of illustration, the sensing pin groups of Figs. 4 and 5, each of which is adapted to sense one complete character or digit, have been broken up and illustrated in Fig. 6 adjacent the respective groups of relays which they control. The groups of relays which accommodate the sensing of a card have been labeled "Card," the groups of relays which accommodate this month's tape 151 have been labeled "T. M. Tape," and the groups of relays which accommodate last month's tape 150 have been labeled "L. M. Tape."

All of the metallic sensing bars 169, which are employed for sensing last month's account numbers, are electrically connected together and all of the bars 169', which are employed for sensing the account numbers of this month's tape, are similarly connected together. Likewise, all of the bars 169*a* of the sensing device 145*a* are electrically connected together and corresponding bars of each sensing unit are also electrically connected. All of the hundreds digits, all of the tens digits, and all of the units digits of the three account numbers appearing on the tapes 150, 151 and a card 154, as the case may be, are verified with one another. In reality, the verifier shown in Fig. 6 is a three-way verifier in that it checks the account numbers on the two primary tapes 150 and 151 against each other and also checks them against the account number of any card which may be manually injected into the machine. For the present only, the dual tape circuits relating to the "T. M. Tape" relay groups and the "L. M. Tape" relay groups will be discussed.

The verifier proper includes the previously mentioned pair of output circuit lines 267, 268, by means of which the "Tape-Tape" magnet 272 may be energized. These output lines are associated with the "T. M. Tape" and "L. M. Tape" magnet groups through various magnet-controlled pairs of contacts which are arranged in series. The verifier also includes another pair of output lines 269, 270, by means of which the "Card-Tape" magnet 275 may be energized. These latter output lines are associated with the three magnet groups, "Card," "T. M. Tape" and "L. M. Tape."

When all of the magnets in the verifier are in their normal deenergized position, a circuit leading from the line 267 to the line 268 is complete so that insofar as the "Tape-Tape" magnet 272 is concerned, this magnet is energized. The circuit existing from the line 267 to the line 268 may be traced as follows: line 267, contacts *aa, bb, cc, dd, ee, ff, gg, hh, ii, jj, kk, ll, mm, nn, oo, pp, qq, rr, ss, tt, uu, vv, ww, xx* and line 268. The contacts 273 are opened and the circuit through the stop relay magnet 252 is open so that the machine will continue to function. Under the same conditions, when all of the magnets of the verifier are in their normally deenergized condition, a circuit leading from the line 269 to the line 270 through the various magnet-controlled series contacts is ordinarily complete so that the pair of contacts 276 are closed. However, because of the fact that during normal operation of the machine the operator will have placed a card in the card sensing device bearing an account number, the magnets in the card section of the verifier will never remain deenergized. Under these conditions the machine will continue to function. It will be understood that the above outlined conditions are obtained when tape-to-tape verification takes place in the sensing units 145 and 145' but does not take place among the three sensing units 145, 145' and 145a.

Where only tape-to-tape verification of account numbers is concerned and no card having the same account number is present in the machine, should any two corresponding pairs of relay magnets in the "T. M. Tape" and "L. M. Tape" groups become energized, by virtue of verification of a character in the two sensing devices 145, 145', the energized magnets will divert or reroute the circuit leading from the line 267 to the line 268 without breaking it, while the remaining corresponding unenergized pairs of magnets will not change over. For example, should the two units magnets labeled 1 in the "T. M. Tape" group and the "L. M. Tape" group respectively both be energized, the rerouted or diverted circuit leading from the line 267 to the line 268 would be traced as follows: *a1a1, b1b1, cc, dd, ee, ff, gg, hh, ii, jj, kk, ll, mm, nn, oo, pp, qq, rr, ss, tt, uu, vv, ww, xx* and line 268. Thus, where the account numbers of the two primary tapes 150 and 151 are alike, only matched pairs of magnets in the verifier groups will become energized and the circuit leading through the "Tape-Tape" magnet 272 will remain complete and this latter magnet will remain energized so that the pair of contacts 273 will remain open and the machine will continue to function. When the account numbers on the two tapes differ, the various magnets in the two magnet groups are not energized in matched pairs and the unmatched pairs of magnets will not reroute the circuit through the various magnet-controlled series contacts but will open this circuit and not allow energization of the "Tape-Tape" magnet, thus allowing the pair of contacts 273 to remain closed so that the stop relay is energized and the contacts 251 are opened, thus deenergizing the motor M.

The manner in which the account number appearing on a special account card inserted into the sensing device 145a is checked against the account numbers of the two primary tapes is similar in many respects to tape-to-tape verification of account numbers. When the account number on the card and on the two primary tapes are identical, corresponding relay magnets in the three relay groups, namely, "Card," "T. M. Tape" and "L. M. Tape" will become energized in unison. Under such conditions, the circuit leading from the line 269 to the line 270 will find a path through the various pairs of series contacts and the "Card-Tape" magnet 275 will become energized so that the pair of contacts 276 will become closed and the stop relay magnet will be connected to the negative side of the power line thus stopping the machine. If it is assumed that the three units magnets labeled 1 in the "Card" group, the "T. M. Tape" group and the "L. M. Tape" group are all energized, the circuit by means of which the line 269 is connected to the line 270 may be traced as follows: line 269, contacts *a2a2, b2b2, c2c2, d2d2, e2e2, f2f2, g2g2, h2h2, i2i2, j2j2, k2k2, l2l2, m2m2, n2n2, o2o2, p2p2, q2q2, r2r2, s2s2, t2t2, u2u2, v2v2, w2w2, x2x2, y2y2, z2z2, a3a3, b3b3, c3c3, d3d3, e3e3, f3f3, g3g3, h3h3, i3i3, j3j3* and line 270.

From the above description, to summarize, it will be seen that the function of the verifier 265 is either to cause energization of the stop relay magnet 252 or to maintain this magnet deenergized. When the magnet is energized, the machine will stop. Energization of this magnet will take place only when the account numbers on the two primary tapes fail to verify with each other or when the account numbers on these tapes verify and also verify with the account number appearing on a card injected into the sensing device 145a.

The invention is not to be limited to the exact arrangement of parts shown in the accompanying drawings or described in this specification as various changes in the details of construction may be resorted to without departing from the spirit of the invention. For example, while the invention has been illustrated and described in connection with an apparatus which is designed for use in the processing of accounts wherein two commodities are jointly billed, it is obvious that by suitable modification or elimination of parts the apparatus may be adapted for use in connection with accounts which are concerned with only one commodity or with more than two commodities. Only insofar as the invention has been pointed out in the accompanying claims is the same to be limited.

What is claimed is:

1. In an apparatus of the character described, three sensing devices each having associated therewith sensing elements and each sensing device being adapted to sense a series of data-designating perforations appearing in a primary data-bearing record media, a normally closed circuit, a relay operable upon energization thereof for opening said circuit, a second relay operable upon energization thereof for closing said circuit, a circuit for each of said relays, a verifier including three similar banks of magnets, the magnets of each bank being electrically arranged in three groups, each of which represents a digit of the number sensed, each magnet of each group being electrically connected to a respective sensing element in the sensing device with which its group is associated, and plural contacts controlled by each magnet, said contacts being arranged in labyrinth circuits whereby they are operable when corresponding magnets in two of said banks are energized to close the circuit of said first relay and whereby they are operable when corresponding magnets in all three of the banks are energized for closing the circuit of said second relay.

2. In an apparatus for verifying the data appearing on three record media, a sensing device for each record media including a plurality of sensing elements, a normally closed work circuit, a normally energized stop relay operable upon energization thereof to open said circuit, a normally deenergized control relay operable upon energization thereof to cause deenergization of said stop relay, a second normally deenergized control relay operable upon energization thereof to cause energization of said stop relay, a relay magnet for each sensing element, means connecting each relay magnet and sensing element in an electrical circuit, and labyrinth circuits under the control of each relay magnet operable when the data undergoing sensing on two of said record media agree but do not agree with the data undergoing sensing on the third record media to cause energization of said first control relay and also operable when the data undergoing sensing on said two record media agree and additionally agree with the data undergoing sensing on the third record media to cause energization of said second control relay.

WARD LEATHERS.
JERRIER HADDAD.